(12) United States Patent
Cheng

(10) Patent No.: US 11,437,680 B2
(45) Date of Patent: Sep. 6, 2022

(54) BATTERY HOLDING DEVICE FOR PREVENTING ERRONEOUS CHARGING

(71) Applicant: MIPRO ELECTRONICS CO., LTD., Chiayi (TW)

(72) Inventor: Sue Cheng, Taibao (TW)

(73) Assignee: MIPRO ELECTRONICS CO., LTD., Chiayi (TW)

(*) Notice: Subject to any disclaimer, the term of this patent is extended or adjusted under 35 U.S.C. 154(b) by 240 days.

(21) Appl. No.: 16/895,199

(22) Filed: Jun. 8, 2020

(65) Prior Publication Data

US 2021/0218002 A1 Jul. 15, 2021

(30) Foreign Application Priority Data

Jan. 15, 2020 (TW) .................. 109200595

(51) Int. Cl.
*H01M 6/46* (2006.01)
*H01M 50/213* (2021.01)
*H01M 10/44* (2006.01)

(52) U.S. Cl.
CPC ......... *H01M 50/213* (2021.01); *H01M 10/44* (2013.01)

(58) Field of Classification Search
CPC ............ H01M 50/213; H01M 50/209; H01M 50/207; H01M 50/202; H01M 10/46; H01M 10/48; H01M 10/482; H01M 10/44; H01M 10/441; H01M 10/446; H01M 10/448
See application file for complete search history.

(56) References Cited

U.S. PATENT DOCUMENTS

| 10,245,936 | B2 * | 4/2019 | Gillett ................... B62K 17/00 |
| 10,717,361 | B2 * | 7/2020 | Nishinaka ............. B60L 3/0046 |
| 2019/0069060 | A1 * | 2/2019 | Su ......................... H04M 1/271 |
| 2019/0306602 | A1 * | 10/2019 | Green, III ............... H01Q 1/27 |

* cited by examiner

*Primary Examiner* — Raymond Alejandro
(74) *Attorney, Agent, or Firm* — Muncy, Geissler, Olds & Lowe, P.C.

(57) ABSTRACT

A battery holding device is provided for preventing erroneous charging when being electrically connected to a power source. The battery holding device includes a battery holding mechanism and a charging control module. The battery holding mechanism is adapted to selectively accommodate a rechargeable first battery or two non-rechargeable second batteries. The charging control module is configured to control an electrical connection between the battery holding mechanism and the power source, and includes a sensor and a control unit. The electrical connection is allowed by the control unit to permit the first battery to be charged by the power source only when the first battery is installed in the installation space.

12 Claims, 6 Drawing Sheets

BATTERY HOLDING DEVICE FOR PREVENTING ERRONEOUS CHARGING

CROSS-REFERENCE TO RELATED APPLICATION

This application claims priority from Taiwanese utility model patent application no. 109200595, filed on Jan. 15, 2020.

FIELD

The disclosure relates to a battery holding device, more particularly to a battery holding device which may be used for charging a rechargeable battery therein, and which may prevent non-rechargeable batteries therein from being accidentally charged.

BACKGROUND

Two kinds of batteries are used in wireless microphones: non-rechargeable batteries such as AA battery cells, and rechargeable batteries such as 18500 battery cells. To increase the functionality of the wireless microphone, some manufacturers have begun to develop a battery holding mechanism of a wireless microphone for selectively holding one 18500 battery cell, or two juxtaposed AA battery cells. The battery holding mechanism may also be designed to electrically connect to a power source for charging the rechargeable battery therein. However, the AA battery cells are not rechargeable. If the AA battery cells in the wireless microphone are accidentally charged, the AA battery cells may overheat and burst, posing a safety issue.

SUMMARY

Therefore, an object of the disclosure is to provide a novel battery holding device which overcomes at least one drawback of the prior art mentioned above.

According to a first aspect of the disclosure, a battery holding device is provided for preventing erroneous charging when being electrically connected to a power source, and is adapted to selectively accommodate a rechargeable first battery having a first outer diameter, or two non-rechargeable second batteries each having a second outer diameter smaller than the first outer diameter. The battery holding device includes a battery holding mechanism and a charging control module. The battery holding mechanism defines therein an installation space which is configured to selectively permit only the first battery to be installed in the installation space, or permit only the second batteries to be installed in the installation space in a juxtaposed manner. The charging control module is configured to control an electrical connection between the battery holding mechanism and the power source, and includes a sensor and a control unit. The sensor is disposed on the battery holding mechanism to determine whether or not the second batteries are installed in the installation space. The control unit is connected electrically to the sensor such that when the sensor determines that the second batteries are absent in the installation space, the electrical connection is allowed by the control unit to permit the first battery to be charged by the power source, and such that when the sensor determines that the second batteries are installed in the installation space, the electrical connection is blocked by the control unit to prevent the second batteries from being accidentally charged.

According to a second aspect of the disclosure, a battery holding device is provided for preventing erroneous charging when being electrically connected to a power source, and is adapted to selectively accommodate a rechargeable first battery having a first outer diameter, or two non-rechargeable second batteries each having a second outer diameter smaller than the first outer diameter. The battery holding device includes a battery holding mechanism and a charging control module. The battery holding mechanism defines therein an installation space which is configured to selectively permit only the first battery to be installed in the installation space, or permit only the second batteries to be installed in the installation space in a juxtaposed manner. The charging control module is configured to control an electrical connection between the battery holding mechanism and the power source, and includes a sensor and a control unit. The sensor is disposed on the battery holding mechanism to determine whether or not the first battery is installed in the installation space. The control unit is connected electrically to the sensor such that when the sensor determines that the first battery is installed in the installation space, the electrical connection is allowed by the control unit to permit the first battery to be charged by the power source, and such that when the sensor determines that the first battery is absent in the installation space, the electrical connection is blocked by the control unit to prevent the second batteries from being accidentally charged.

With the provision of the battery holding mechanism for selective accommodation of only the rechargeable first battery or only the non-rechargeable second batteries, the battery holding device may have improved functionality. With the provision of the charging control module for control the electrical connection between the battery holding mechanism and the power source, the safety of the battery holding device may be improved.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
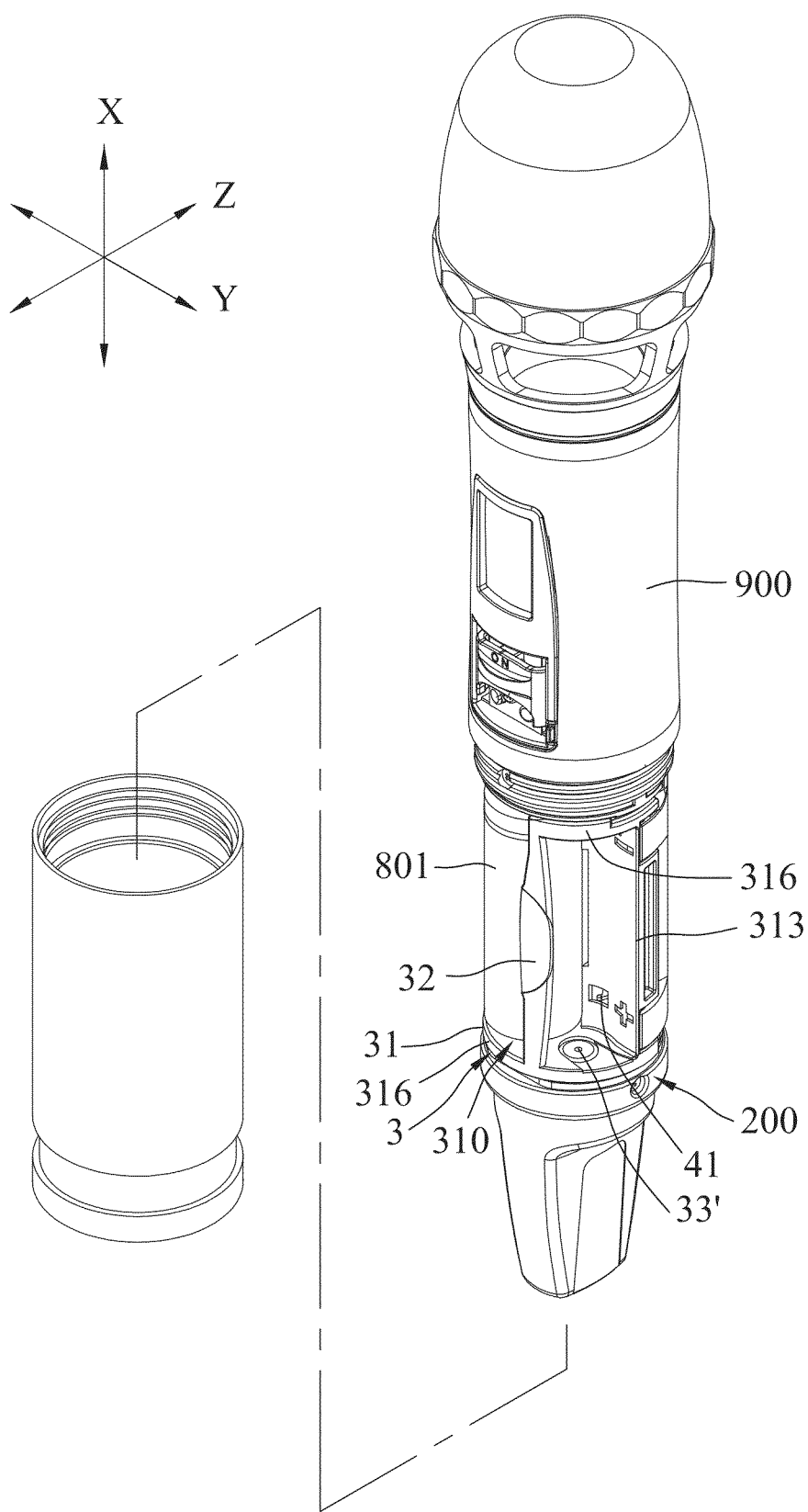
FIG. 1 is a partially exploded perspective view of an electronic apparatus with a battery holding device according to a first embodiment of the disclosure.

Before the disclosure is described in greater detail, it should be noted that where considered appropriate, reference numerals have been repeated among the figures to indicate corresponding or analogous elements, which may optionally have similar characteristics.

Referring to FIGS. 1 to 4, a battery holding device 200 according to a first embodiment of the disclosure may be provided in an electronic apparatus 900, and is provided for preventing erroneous charging when being electrically connected to a power source (not shown). The battery holding device 200 is adapted to selectively accommodate a rechargeable first battery 801 having a first outer diameter, or two non-rechargeable second batteries 802 each having a second outer diameter smaller than the first outer diameter. In an embodiment shown in FIG. 1, the electronic apparatus 900 may be, but is not limited to, a wireless microphone, and the power source may be, but is not limited to, a charging stand (not shown) for the electronic apparatus 900 and for charging the first battery 801 inside the battery holding device 200. In addition, the first battery 801 may be, but is not limited to, a rechargeable 18500 battery cell, and each of the second batteries 802 may be, but is not limited to, a non-rechargeable AA battery cell.

The battery holding device 200 includes a battery holding mechanism 3 and a charging control module 4.

The battery holding mechanism 3 defines therein an installation space 310 which is configured to selectively permit only the first battery 801 to be installed in the installation space 310, or permit only the second batteries 802 to be installed in the installation space 310 in a juxtaposed manner.

In an embodiment shown in FIGS. 1 to 4, the battery holding mechanism 3 may include a battery holder 31 which is embedded in the electronic apparatus 900, and which defines the installation space 310 therein. The battery holder 31 may include a first body segment 311 and a second body segment 313. The first body segment 311 has a first abutment surface 312 configured for selectively abutting against an outer periphery of the first battery 801 or an outer periphery of a first one of the second batteries 802 (the left second battery 802 shown in FIG. 3). The second body segment 313 has a second abutment surface 314 configured for abutting against an outer periphery of a second one of the second batteries 802 (the right second battery 802 shown in FIG. 3). The second body segment 313 may have a recess 315 in the second abutment surface 314. Each of the first and second abutment surfaces 312, 314 may be a curved surface. The first abutment surface 312 may have a curvature which is smaller than a curvature of the outer periphery of each of the second batteries 802, and which is substantially the same as a curvature of the outer periphery of the first battery 801.

In an embodiment shown in FIGS. 1 to 4, the battery holding mechanism 3 may further include a resilient positioning member 32 which is spaced apart from the first and second abutment surfaces 312, 314. When the first battery 801 is installed in the installation space 310 (FIG. 4), the resilient positioning member 32 is disposed to bring the first battery 801 into resilient abutment against the first abutment surface 312 to thereby position the first battery 801 within the battery holder 31. When the second batteries 802 are installed in the installation space 310 (FIG. 3), the resilient positioning member 32 is disposed to bring the second one of the second batteries 802 on the second abutment surface 314 into abutment against the first one of the second batteries 802 to thereby position the second batteries 802 within the battery holder 31 in the juxtaposed manner. The resilient positioning member 32 may be made of a plastic deformable material.

In an embodiment shown in FIGS. 1 to 4, the installation space 310 extends in an X direction to selectively permit only the first battery 801 to be axially installed in the installation space 310 in the X direction, or permit only the second batteries 802 to be axially installed in the installation space 310 in the X direction in the juxtaposed manner. The first and second body segments 311, 313 are displaced from each other in a Y direction orthogonal to the X direction. The resilient positioning member 32 is spaced apart from the first and second abutment surfaces 312, 314 in a Z direction orthogonal to both the X and Y directions. The first and second abutment surfaces 312, 314 define a level difference to permit axles of the second batteries 802 installed in the installation space 310 to be in different levels in the Z direction.

Figure 3:
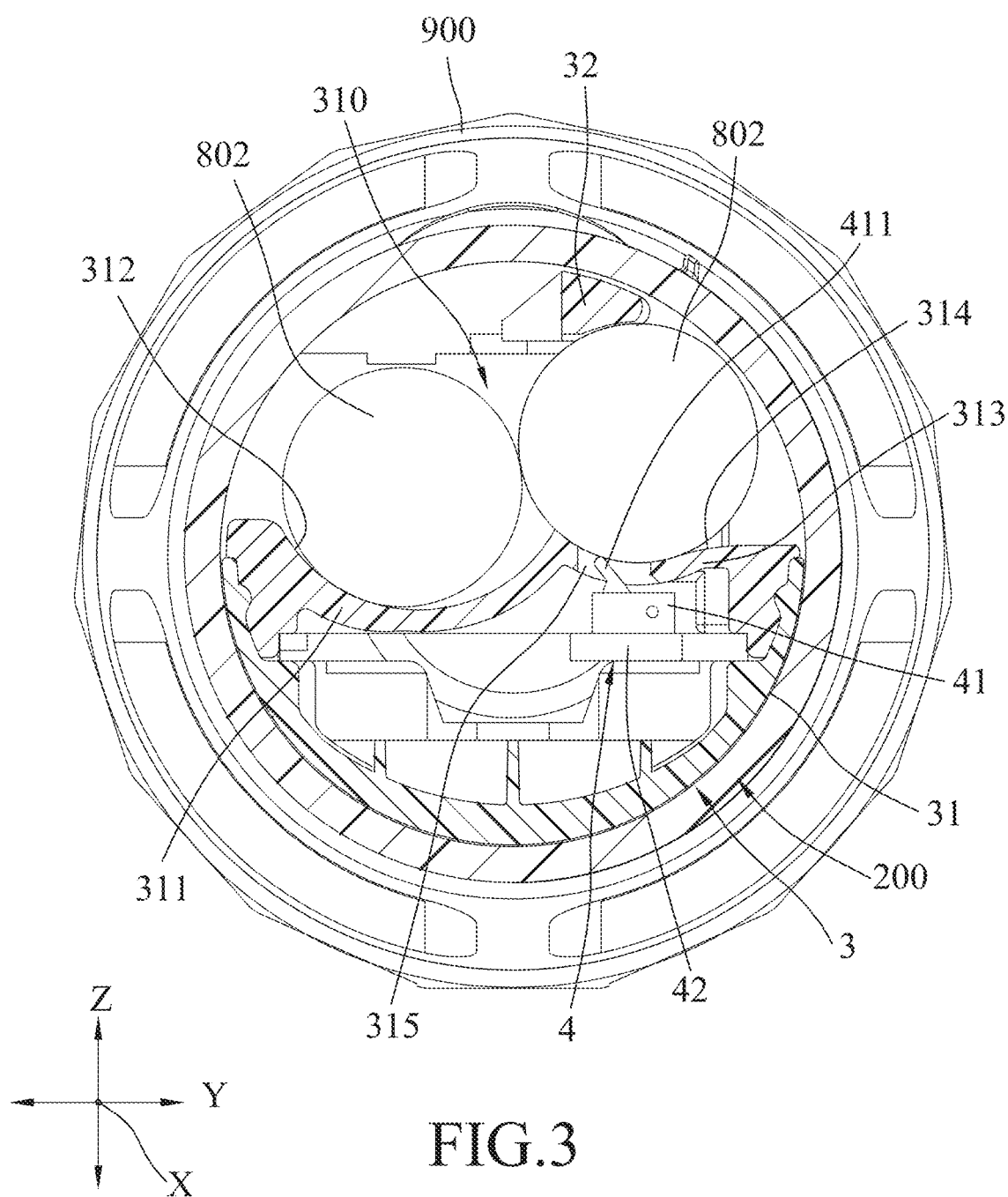
FIG. 3 is a cross-sectional view of the electronic apparatus illustrating two non-rechargeable second batteries installed in the battery holding device of the first embodiment.
Figure 4:
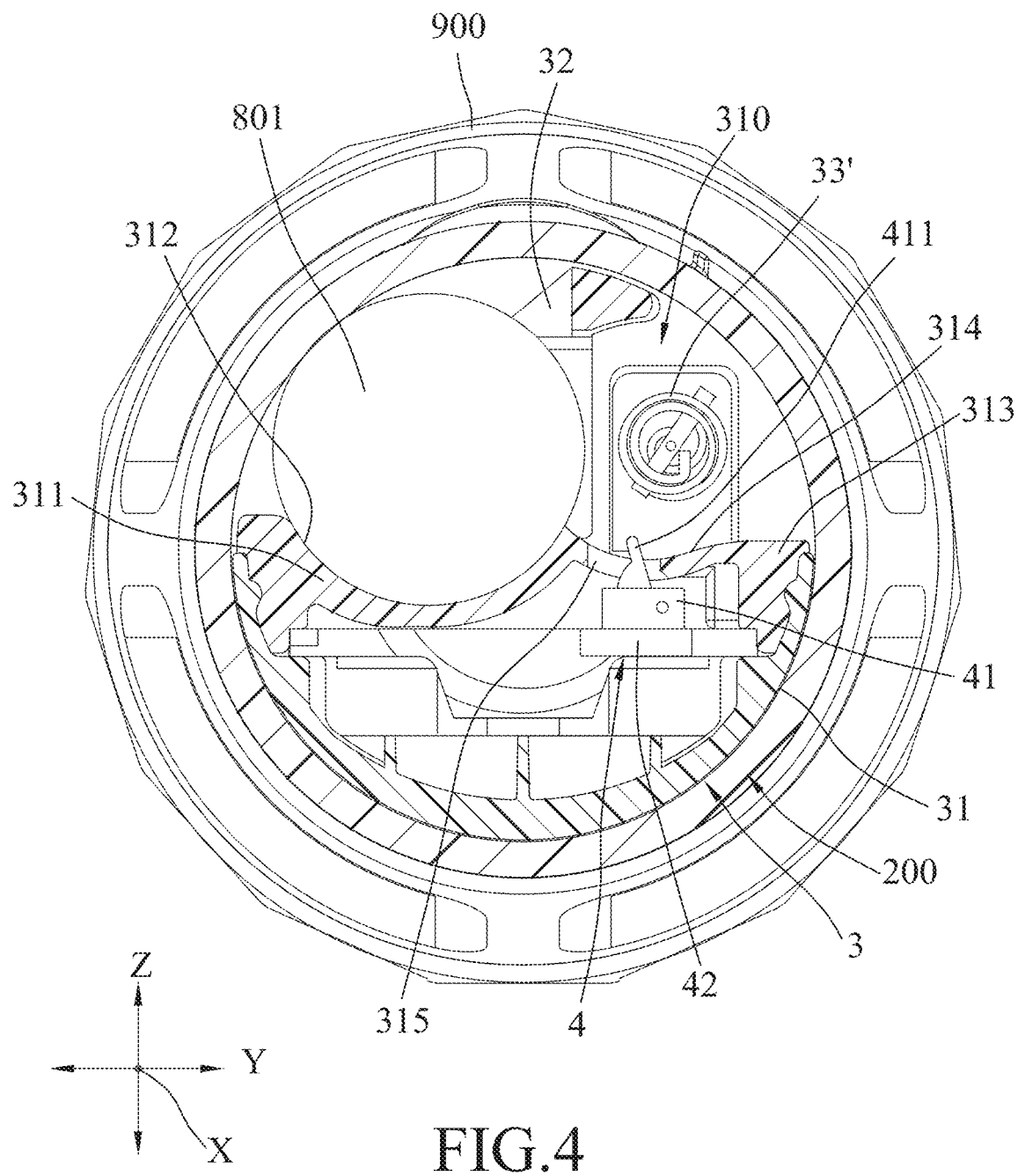
FIG. 4 is a cross-sectional view of the electronic apparatus illustrating a rechargeable first battery installed in the battery holding device of the first embodiment.

In an embodiment shown in FIGS. 3 and 4, a distance between the resilient positioning member 32 and the second abutment surface 314 in the Z direction is smaller than a distance between the resilient positioning member 32 and the first abutment surface 312 in the Z direction so as to prevent the first battery 801 from being installed between the resilient positioning member 32 and the second abutment surface 314.

Figure 2:
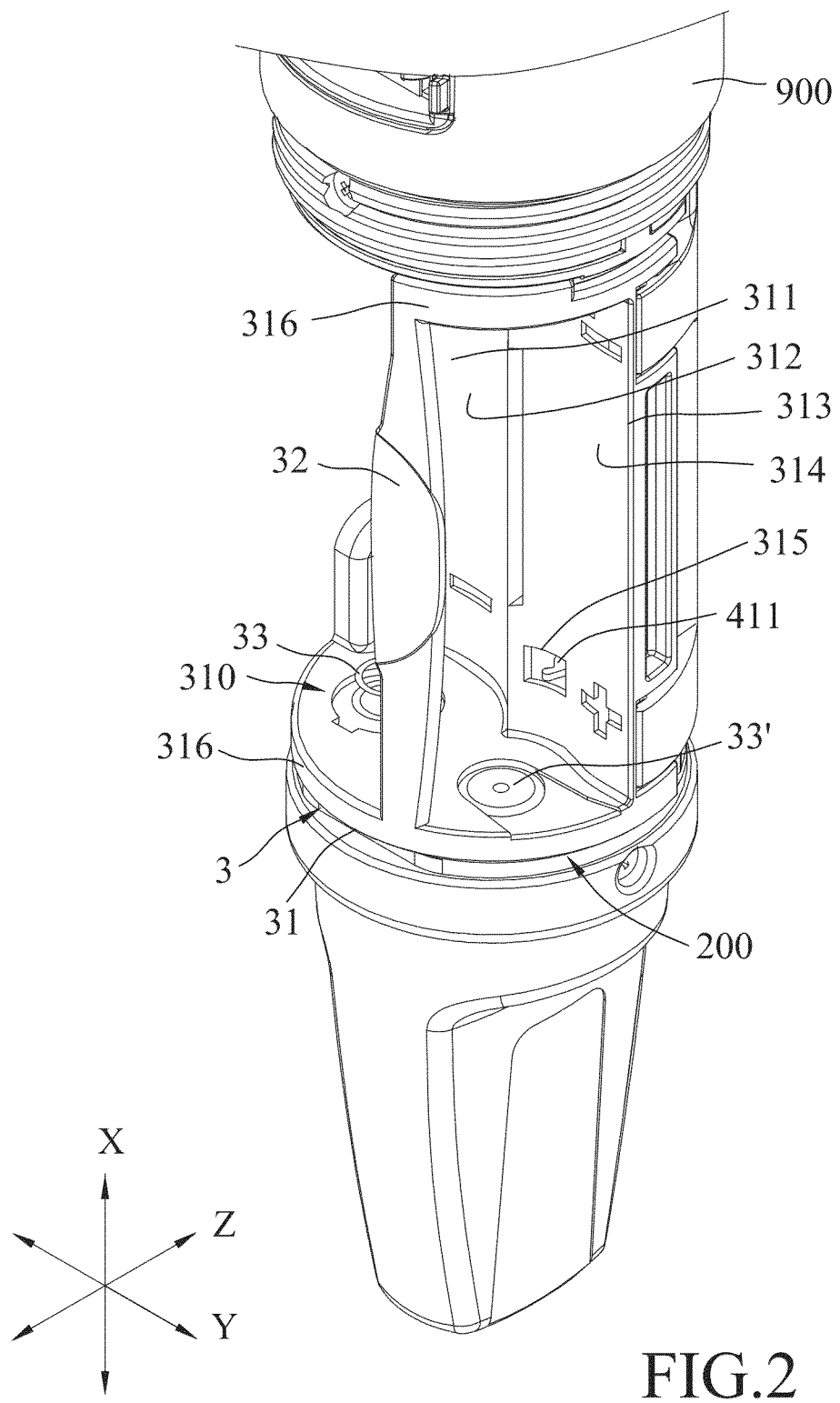
FIG. 2 is a fragmentary enlarged perspective view illustrating the battery holding device of the first embodiment in the electronic apparatus.

In an embodiment shown in FIGS. 1 and 2, the battery holder may further include two end wall portions 316 which are spaced apart from each other in the X direction. An upper one of the end wall portions 316 is connected to upper ends of the first and second body segments 311, 313, and a lower one of the end wall portions 316 is connected to lower ends of the first and second body segments 311, 313. The two end portions 316 and the first and second body segments 311, 313 cooperatively define the installation space 310 therebetween. The resilient positioning member 32 has two ends which are opposite to each other in the X direction, and which are respectively connected to the end wall portions 316.

Furthermore, a distance between the resilient positioning member 32 and the first abutment surface 312 is slightly smaller than the first outer diameter of the first battery 801. A distance between the resilient positioning member 32 and the second abutment surface 314 is substantially equal to the second outer diameter of each of the second batteries 802. Therefore, a zone between the resilient positioning member 32 and the second abutment surface 314 may accommodate only one of the second batteries 802.

In the case that the first battery 801 is installed in the installation space 310 (FIG. 4), the resilient positioning member 32 is deformed by the first battery 801 and the first battery 801 is resiliently brought by the resilient positioning member 32 into abutment with the first body segment 311 to thereby permit the first battery 801 to be resiliently positioned within the battery holder 31.

In the case that the second batteries 802 are installed in the installation space 310 (FIG. 3), due to the level difference between the first and second abutment surfaces 312, 314, the outer periphery of the right second battery 802 arranged on the second body segment 313 has a rear left portion in abutting engagement with a front right portion of the outer periphery of the left second battery 802 arranged on the first body segment 311. The right second battery 802 arranged on the second body segment 313 is resiliently brought by the resilient positioning member 32 into abutting engagement with the left second battery 802 arranged on the first body segment 311 to thereby force the left second battery 802 in the Y direction into abutting engagement with the first abutment surface 312. Because the right second battery 802 is positioned between the resilient positioning member 32 and the second body segment 313, the left second battery 802, abutted by the right second battery 802, may be prevented from undesirably moving out of the installation space 310. Because of this, the two second batteries 802 may be stably installed in the installation space 310.

In an embodiment shown in FIGS. 1, 2 and 4, the battery holding mechanism 3 may further includes a pair of first electrodes 33 (only one is shown in FIG. 2) and a pair of second electrodes 33' (one is shown in FIGS. 1 and 2, and the other one is shown in FIG. 4). The first electrodes 33 are respectively mounted on the end wall portions 316 in the installation space 310 to be spaced apart from each other in the X direction. The second electrodes 33' are respectively mounted on the end wall portions 316 in the installation space 310 to be spaced apart from each other in the X direction, and are respectively spaced apart from the first electrodes 33 in the Y direction. In this embodiment, the first electrodes 33 are configured for being selectively in electrical contact with two electrodes (not shown) of the first battery 801 or two electrodes (not shown) of the first one of the second batteries 802 (the left second battery 802 shown in FIG. 3). The second electrodes 33' are configured for being in electrical contact with two electrodes (not shown) of the second one of the second batteries 802 (the right second battery 902 shown in FIG. 3). The provision of the electrodes for electrical connection with the batteries is well known in the art, and the details thereof are omitted for brevity.

The charging control module 4 is configured to control an electrical connection between the battery holding mechanism 3 and the power source, and includes a sensor 41 and a control unit 42. The sensor 41 is disposed on the battery holding mechanism 3 to determine whether or not the second batteries 802 are installed in the installation space 310. The control unit 42 is connected electrically to the sensor 41. When the sensor 41 determines that the second batteries 802 are absent in the installation space 310 (FIG. 4), the electrical connection is allowed by the control unit 42 to permit the first battery 801 to be charged by the power source. When the sensor 41 determines that the second batteries 802 are installed in the installation space 310 (FIG. 3), the electrical connection is blocked by the control unit 42 to prevent the second batteries 802 from being accidentally charged. In other words, the electrical connection is normally allowed by the control unit 42, and will be blocked only when the sensor 41 determines that the second batteries 802 are installed in the installation space 310.

In an embodiment shown in FIGS. 2 to 4, the sensor 41 is mounted to the second body segment 313 for determining whether or not the second one of the second batteries 802 (i.e., the right second battery 802 shown in FIG. 3) is installed in the installation space 310.

In an embodiment shown in FIGS. 2 to 4, the sensor 41 may be a microswitch including a sensor pin 411 which is disposed in the recess 315 and which is biased to protrude into the installation space 310. Only in response to the installation of the second one of the second batteries 802 (i.e., the right second battery 802 shown in FIG. 3) into the installation space 310 is the sensor pin 411 forced by the right second battery 802 into the recess 315 to thereby permit the sensor 41 to determine that the second batteries 802 are installed in the installation space 310. At this point, a battery charging circuit (not shown) among the electrodes 33, 33' and the power source is switched off to block the electrical connection, and thus, the second batteries 802 may be prevented from being accidentally charged.

On the other hand, when the first battery 801 is installed in the installation space 310 (FIG. 4), the sensor pin 411 will not be forced into the recess 315, and the battery charging circuit is switched on to allow the electrical connection. Therefore, the first battery 801 installed in the installation space 310 may be charged by the power source.

Please note that although the sensor 41 in the embodiment shown in FIGS. 2 to 4 is a microswitch, the sensor 41 should not be limited to the mircoswitch. For example, in other embodiments, the sensor 41 may be an interruption type optical sensor or a reflection type optical sensor for detecting whether or not the right second battery 802 is installed.

Figure 5:
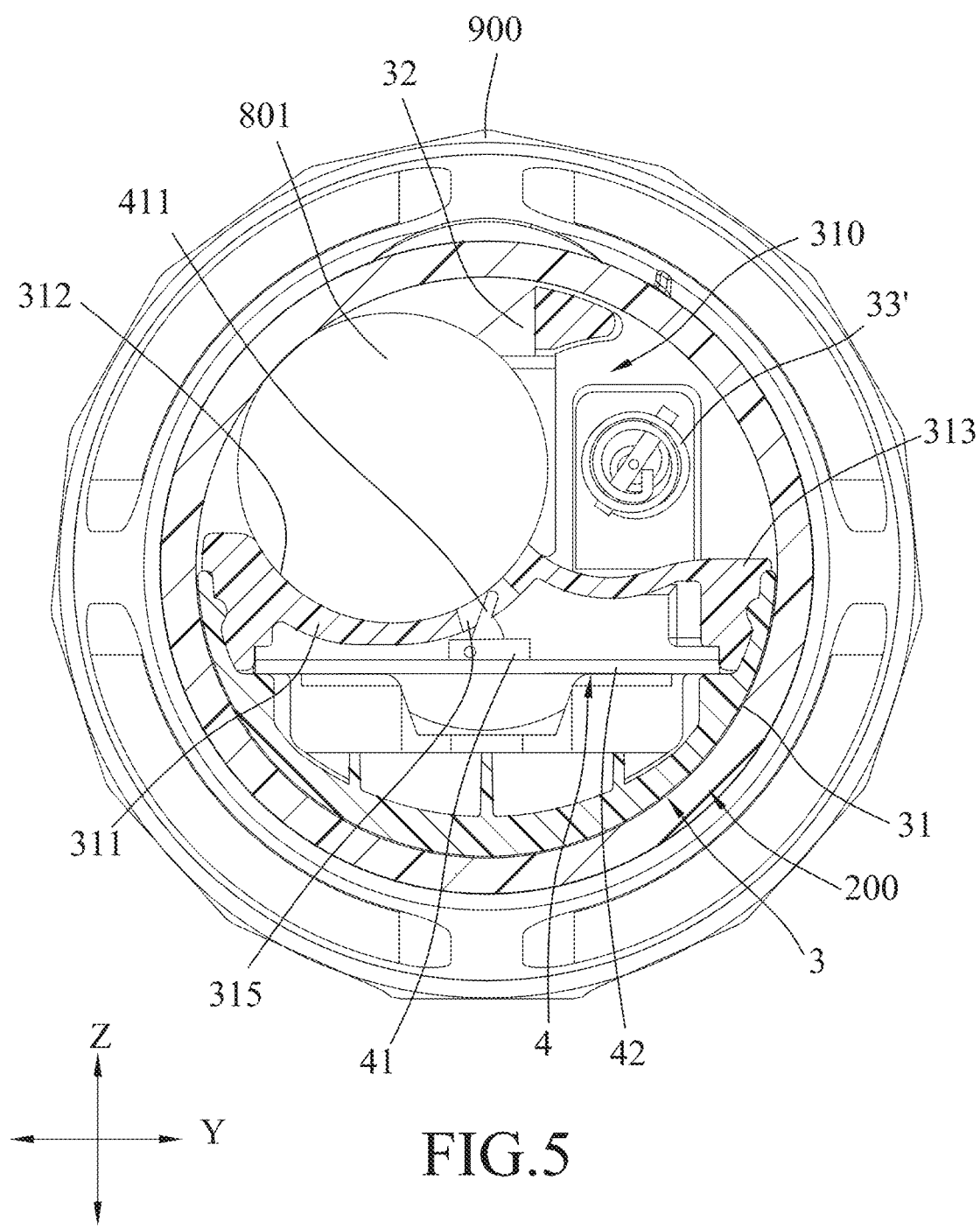
FIG. 5 is a cross-sectional view of an electronic apparatus illustrating a rechargeable first battery installed in a battery holding device according to a second embodiment of the disclosure.
Figure 6:
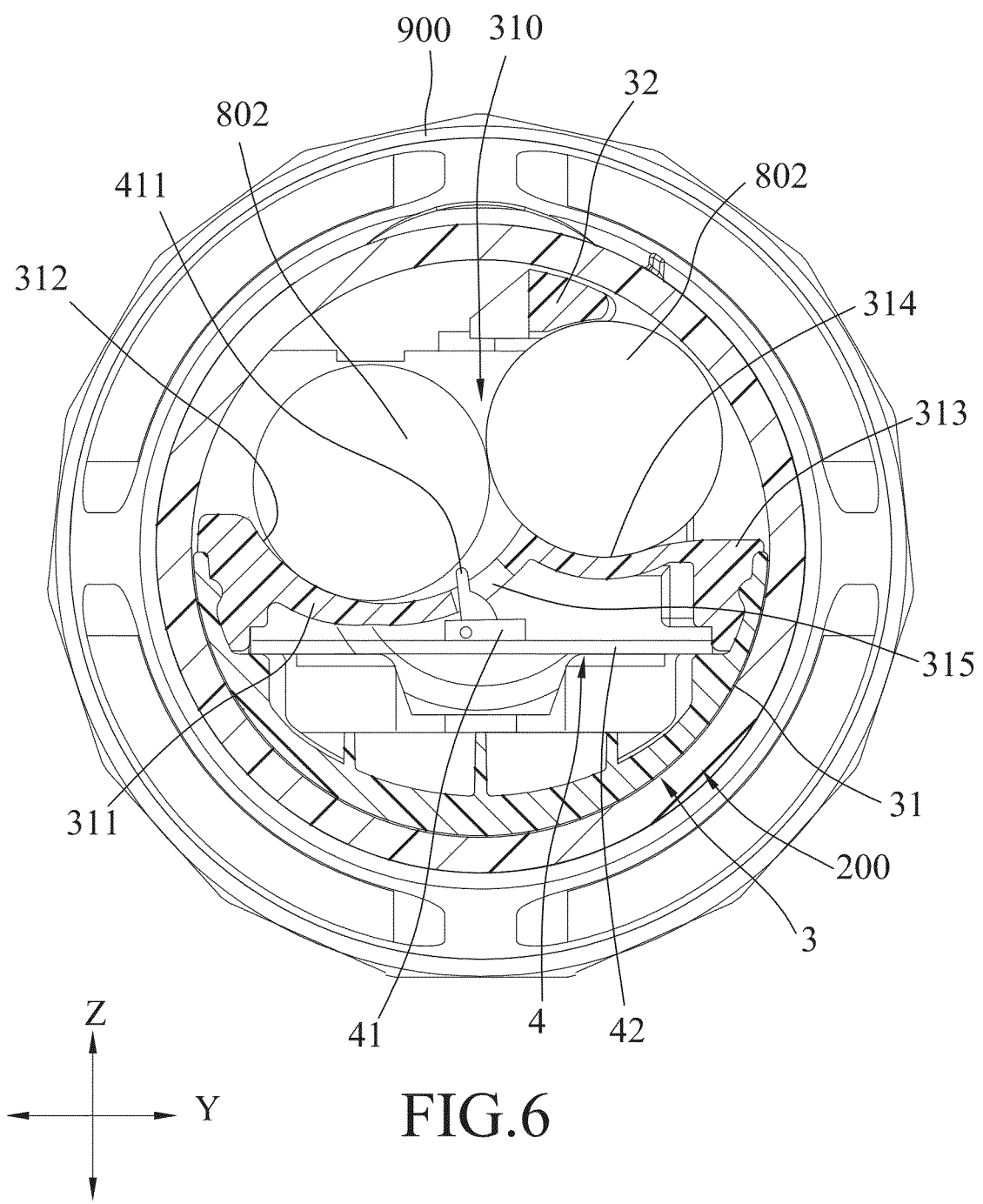
FIG. 6 is a cross-sectional view of the electronic apparatus illustrating two non-rechargeable second batteries installed in the battery holding device of the second embodiment.

FIGS. 5 and 6 illustrate a battery holding device 200 according to a second embodiment of the disclosure. The second embodiment is similar to the first embodiment except the arrangement of the charging control module 4. In the second embodiment, the sensor 41 is disposed on the battery holding mechanism 3 to determine whether or not the first battery 801 is installed in the installation space 310. When the sensor 41 determines that the first battery 801 is installed in the installation space 310, the electrical connection between the battery holding mechanism 3 and the power source is allowed by the control unit 42 to permit the first battery 801 to be charged by the power source. When the sensor 41 determines that the first battery 801 is absent in the installation space 310, the electrical connection is blocked by the control unit 42 to prevent the second batteries 802 from being accidentally charged. In other words, the electrical connection is normally blocked by the control unit 42, and will be allowed only when the sensor 41 determines that the first battery 801 is installed in the installation space 310.

In an embodiment shown in FIGS. 5 and 6, the sensor 41 is mounted to the first body segment 311 for determining whether or not the first battery 801 is installed in the installation space 310.

In an embodiment shown in FIGS. 5 and 6, the first abutment surface 312 has a curvature smaller than a curvature of the outer periphery of each of the second batteries 802, and a recess 315 is formed in a region of the first abutment surface 312 where the left second battery 802 shown in FIG. 6 does not come in contact therewith.

Furthermore, the sensor 41 is a microswitch including a sensor pin 411 which is disposed in the recess 315 and which is biased to protrude into the installation space 310. Only in response to the installation of the first battery 801 into the installation space 310 is the sensor pin 411 forced by the first battery 801 into the recess 315 to thereby permit the sensor 41 to determine that the first battery 801 is installed in the installation space 310. At this point, the battery charging circuit among the electrodes 33, 33' and the power source is switched on to allow the electrical connection, and thus, the first battery 801 may be charged by the power source.

On the other hand, if the first battery 801 is not installed, the battery charging circuit is switched off to block the electrical connection. Therefore, the second batteries 802 installed in the installation space 310 may be prevented from being accidently charged.

The sensor 41 in the second embodiment should not be limited to the microswitch as the same reason mentioned above.

In sum, with the provision of the battery holding mechanism 3 for selective accommodation of only the rechargeable first battery 801 or only the non-rechargeable second batteries 802, the battery holding device 200 may have improved functionality. With the provision of the charging control module 4 for control the electrical connection between the battery holding mechanism 3 and the power source, it is ensured that only the rechargeable first battery 801 can be charged by power source, and thus, the safety of the battery holding device 200 may be improved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A battery holding device for preventing erroneous charging when being electrically connected to a power source, said battery holding device being adapted to selectively accommodate a rechargeable first battery having a first outer diameter, or two non-rechargeable second batteries each having a second outer diameter smaller than the first outer diameter, said battery holding device comprising:
    a battery holding mechanism defining therein an installation space which is configured to selectively permit only the first battery to be installed in said installation space, or permit only the second batteries to be installed in said installation space in a juxtaposed manner; and
    a charging control module configured to control an electrical connection between said battery holding mechanism and the power source, said charging control module including
        a sensor disposed on said battery holding mechanism to determine whether or not the second batteries are installed in said installation space, and
        a control unit which is connected electrically to said sensor such that when the sensor determines that the second batteries are absent in said installation space, the electrical connection is allowed by said control unit to permit the first battery to be charged by the power source, and such that when the sensor determines that the second batteries are installed in said installation space, the electrical connection is blocked by said control unit to prevent the second batteries from being accidentally charged.

2. The battery holding device according to claim 1, wherein said battery holding mechanism includes a battery holder which defines said installation space therein, and which includes
    a first body segment having a first abutment surface which is configured for selectively abutting against an outer periphery of the first battery or an outer periphery of a first one of the second batteries, and
    a second body segment having a second abutment surface which is configured for abutting against an outer periphery of a second one of the second batteries; and
    wherein said sensor is mounted to said second body segment for determining whether or not the second one of the second batteries is installed in said installation space.

3. The battery holding device according to claim 2,
    wherein said second body segment has a recess in said second abutment surface; and
    wherein said sensor includes a sensor pin which is disposed in said recess and which is biased to protrude into said installation space such that the sensor pin is forced into said recess only in response to the installation of the second one of the second batteries into said installation space to thereby permit said sensor to determine that the second batteries are installed in said installation space.

4. The battery holding device according to claim 3, wherein said battery holding mechanism further includes a resilient positioning member which is spaced apart from said first and second abutment surfaces, and which is configured such that when the first battery is installed in said installation space, said resilient positioning member is disposed to bring the first battery into resilient abutment against said first abutment surface to thereby position the first battery within said battery holder, and such that when the second batteries are installed in said installation space, said resilient positioning member is disposed to bring the second one of the second batteries on said second abutment surface into abutment against the first one of the second batteries to thereby position the second batteries within said battery holder in the juxtaposed manner.

5. The battery holding device according to claim 4,
    wherein said installation space extends in an X direction to selectively permit only the first battery to be axially installed in the installation space in the X direction, or permit only the second batteries to be axially installed in the installation space in the X direction in the juxtaposed manner;
    wherein said first and second body segments are displaced from each other in a Y direction orthogonal to the X direction;
    wherein said resilient positioning member is spaced apart from said first and second abutment surfaces in a Z direction orthogonal to both the X and Y directions; and
    wherein said first and second abutment surfaces define a level difference to permit axles of the second batteries installed in said installation space to be in different levels in the Z direction.

6. The battery holding device according to claim 5, wherein a distance between said resilient positioning member and said second abutment surface in the Z direction is smaller than a distance between said resilient positioning member and said first abutment surface in the Z direction so as to prevent the first battery from being installed between said resilient positioning member and said second abutment surface.

7. A battery holding device for preventing erroneous charging when being electrically connected to a power source, said battery holding device being adapted to selectively accommodate a rechargeable first battery having a first outer diameter, or two non-rechargeable second batteries each having a second outer diameter smaller than the first outer diameter, said battery holding device comprising:

a battery holding mechanism defining therein an installation space which is configured to selectively permit only the first battery to be installed in said installation space, or permit only the second batteries to be installed in said installation space in a juxtaposed manner; and a charging control module configured to control an electrical connection between said battery holding mechanism and the power source, said charging control module including a sensor disposed on said battery holding mechanism to determine whether or not the first battery is installed in said installation space, and a control unit which is connected electrically to said sensor such that when the sensor determines that the first battery is installed in said installation space, the electrical connection is allowed by said control unit to permit the first battery to be charged by the power source, and such that when the sensor determines that the first battery is absent in said installation space, the electrical connection is blocked by said control unit to prevent the second batteries from being accidentally charged.

8. The battery holding device according to claim 7, wherein said battery holding mechanism includes a battery holder which defines said installation space therein, and which includes a first body segment having a first abutment surface which is configured for selectively abutting against an outer periphery of the first battery or an outer periphery of a first one of the second batteries, and a second body segment having a second abutment surface which is configured for abutting against an outer periphery of a second one of the second batteries; and wherein said sensor is mounted to said first body segment for determining whether or not the first battery is installed in said installation space.

9. The battery holding device according to claim 8, wherein said first body segment has a recess in said first abutment surface; and wherein said sensor includes a sensor pin which is disposed in said recess and which is biased to protrude into said installation space such that the sensor pin is forced into said recess only in response to the installation of the first battery into said installation space to thereby permit said sensor to determine that the first battery is installed in said installation space.

10. The battery holding device according to claim 8, wherein said battery holding mechanism further includes a resilient positioning member which is spaced apart from said first and second abutment surfaces, and which is configured such that when the first battery is installed in said installation space, said resilient positioning member is disposed to bring the first battery into resilient abutment against said first abutment surface to thereby position the first battery within said battery holder, and such that when the second batteries are installed in said installation space, said resilient positioning member is disposed to bring the second one of the second batteries on said second abutment surface into abutment against the first one of the second batteries to thereby position the second batteries within said battery holder in the juxtaposed manner.

11. The battery holding device according to claim 10, wherein said installation space extends in an X direction to selectively permit only the first battery to be axially installed in the installation space in the X direction, or permit only the second batteries to be axially installed in the installation space in the X direction in the juxtaposed manner;

wherein said first and second body segments are displaced from each other in a Y direction orthogonal to the X direction;

wherein said resilient positioning member is spaced apart from said first and second abutment surfaces in a Z direction orthogonal to both the X and Y directions; and wherein said first and second abutment surfaces define a level difference to permit axles of the second batteries installed in said installation space to be in different levels in the Z direction.

12. The battery holding device according to claim 11, wherein a distance between said resilient positioning member and said second abutment surface in the Z direction is smaller than a distance between said resilient positioning member and said first abutment surface in the Z direction so as to prevent the first battery from being installed between said resilient positioning member and said second abutment surface.

* * * * *